(12) United States Patent
Tu et al.

(10) Patent No.: US 11,500,229 B2
(45) Date of Patent: *Nov. 15, 2022

(54) DUAL-SLAB-LAYER LOW-LOSS SILICON OPTICAL MODULATOR (71) Applicant: Marvell Asia Pte., Singapore (SG)

(72) Inventors: Xiaoguang Tu, San Jose, CA (US); Masaki Kato, Palo Alto, CA (US)

(73) Assignee: Marvell Asia Pte Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/094,736

(22) Filed: Nov. 10, 2020

(65) Prior Publication Data
US 2021/0116726 A1 Apr. 22, 2021

Related U.S. Application Data (63) Continuation of application No. 16/655,090, filed on Oct. 16, 2019, now Pat. No. 10,852,570.

(51) Int. Cl.
G02F 1/025 (2006.01)
G02F 1/225 (2006.01)
G02F 1/015 (2006.01)
G02F 1/21 (2006.01)

(52) U.S. Cl.
CPC ............ *G02F 1/025* (2013.01); *G02F 1/2257* (2013.01); *G02F 1/0152* (2021.01); *G02F 1/212* (2021.01)

(58) Field of Classification Search
CPC ........ G02F 1/025; G02F 1/0152; G02F 1/212; G02F 1/2257
See application file for complete search history.

(56) References Cited

U.S. PATENT DOCUMENTS

| 6,298,177 | B1 | 10/2001 | House |
| 9,939,666 | B2 | 4/2018 | Chen |
| 10,043,927 | B2 * | 8/2018 | Baehr-Jones ......... H01L 31/107 |
| 10,627,655 | B2 | 4/2020 | Huang et al. |

(Continued)

FOREIGN PATENT DOCUMENTS

| CN | 110658586 A | 1/2020 |
| EP | 2924481 A1 | 9/2015 |

(Continued)

OTHER PUBLICATIONS

Po Dong et al., "Low Vpp, ultralow-energy, compact, high-speed silicon electro-optic modulator", Article, Dec. 7, 2009, vol. 17, No. 25, Optics Express.

(Continued)

*Primary Examiner* — Tina M Wong (57) ABSTRACT

A silicon optical modulator is fabricated to have a multi-slab structure between the contacts and the waveguide, imparting desirable performance attributes. A first slab comprises dopant of a first level. A second slab adjacent to (e.g., on top of) the first slab, comprises a doped region proximate to a contact, and an intrinsic region proximate to the waveguide. The parallel resistance properties and low overlap between the highly doped silicon and optical mode pigtail afforded by the multi-slab configuration, allow the modulator to operate with reduced optical losses and at a high speed. Embodiments may be implemented in a Mach-Zehnder interferometer or in micro-ring resonator modulator configuration.

18 Claims, 4 Drawing Sheets

(56) References Cited

U.S. PATENT DOCUMENTS

| | | | |
|---|---|---|---|
| 10,684,527 | B2 | 6/2020 | Watts et al. |
| 10,852,570 | B1* | 12/2020 | Tu .................. G02F 1/2257 |
| 10,866,440 | B1 | 12/2020 | Cho et al. |
| 2003/0047738 | A1 | 3/2003 | Funabashi et al. |
| 2006/0008223 | A1 | 1/2006 | Gunn et al. |
| 2006/0222039 | A1 | 10/2006 | Yamazaki |
| 2008/0159680 | A1 | 7/2008 | Gill |
| 2009/0080484 | A1 | 3/2009 | Shigihara |
| 2016/0156149 | A1 | 6/2016 | Takabayashi et al. |
| 2016/0202503 | A1 | 7/2016 | Chen |
| 2016/0299363 | A1 | 10/2016 | Wei et al. |
| 2017/0075148 | A1 | 3/2017 | Baudot et al. |
| 2019/0041580 | A1 | 2/2019 | Tu et al. |
| 2019/0384003 | A1 | 12/2019 | Painchaud et al. |
| 2020/0124883 | A1 | 4/2020 | Delisle-Simard et al. |
| 2020/0136353 | A1 | 4/2020 | Ryvkin et al. |
| 2020/0159048 | A1* | 5/2020 | Andy .................. G02F 1/025 |
| 2021/0231866 | A1 | 7/2021 | Tu et al. |
| 2022/0026747 | A1 | 1/2022 | Chen |
| 2022/0179245 | A1 | 6/2022 | Karimelahi et al. |
| 2022/0187635 | A1 | 6/2022 | Karimelahi et al. |

FOREIGN PATENT DOCUMENTS

| | | |
|---|---|---|
| JP | 2007220692 A | 8/2007 |
| WO | WO-2014171005 A1 | 10/2014 |

OTHER PUBLICATIONS

Hui Yu et al., "Optimization of Ion Implantation Condition for Depletion-Type Silicon Optical Modulators", Journal, Dec. 2010, pp. 1763-1768, vol. 46, No. 12.

Tsung-Yang Liow et al., "Silicon Modulators and Germanium Photodetectors on SOI: Monolithic Integration, Compatibility, and Performance Optimization", Journal, Jan./Feb. 2010, pp. 307-315, vol. 16, No. 1.

Ning-Ning Feng et al., "High speed carrier-depletion modulators with 1 4V-cm VpL integrated on 0.25µm silicon-oninsulator waveguides", Article, Apr. 12, 2010, vol. 18, No. 8, Optics Express.

Xiaoguang Tu et al., "Fabrication of low loss and high speed silicon optical modulator using doping compensation method", Article, Sep. 12, 2011, vol. 19, No. 19, Optics Express.

Gyungock Kim, "Low-voltage high-performance silicon photonic devices and photonic integrated circuits operating up to 30 Gb/s", Article, Dec. 19, 2011, vol. 19, No. 27, Optics Express.

Hui Yu et al., "An Equivalent Circuit Model of the Traveling Wave Electrode for Carrier-Depletion-Based Silicon Optical Modulators", Journal, Jun. 1, 2012, pp. 1602-1609, vol. 30, No. 11.

Po Dong et al., "High-speed low-voltage single-drive push-pull silicon Mach-Zehnder modulators", Article, Mar. 12, 2012, vol. 20, No. 6, Optics Express.

Hui Yu et al., "Performance tradeoff between lateral and interdigitated doping patterns for high speed carrier-depletion based silicon modulators", Article, Jun. 4, 2012, vol. 20, No. 12, Optics Express.

Tom Baehr-Jones et al., "Ultralow drive voltage silicon traveling-wave modulator", Article, May 21, 2012, vol. 20, No. 11, Optics Express.

David J. Thomson et al., "50-Gb/s Silicon Optical Modulator", Article, Feb. 15, 2012, pp. 234-236, vol. 24, No. 4.

William M. J. Green et al., "Ultra-compact, low RF power, 10 Gb/s silicon Mach-Zehnder modulator", Article, Dec. 10, 2007, vol. 15, No. 25, Optics Express.

D. Marris-Morini et al., "Low loss 40 Gbit/s silicon modulator based on interleaved junctions and fabricated on 300 mm SOI wafers", Article, Sep. 23, 2013, vol. 21, No. 19, Optics Express.

Xi Xiao et al., "High-speed, low-loss silicon Mach-Zehnder modulators with doping optimization", Article, Feb. 25, 2013, vol. 21, No. 4, Optics Express.

Matthew Streshinsky et al., "Low power 50 Gb/s silicon traveling wave Mach-Zehnder modulator near 1300 nm", Article, Dec. 16, 2013, Optics Express.

T. Baehr-Jones et al., A 25GB/S Silicon Photonics Platform, arXiv preprint arXiv:1203.0767, 2012.

P.O. Weigel et al, Bonded thin film lithium niobate modulator on a silicon photonics platform exceeding 100GHz 3-dB electrical modulation bandwidth, Opt. Express. vol. 26, No. 18, 2018.

X. Zheng et al., A high high-speed tunable silicon photonic ring modulator integrated with ultra ultra-efficient active wavelength control, Opt. Express. vol. 22, No. 10, 2014.

K. Padmaraju et al, Resolving the thermal challenges for silicon microring resonator devices. Nanophotonics. vol. 3, No. 4-5, 2014.

J. Zhou et al., Silicon Photonics for 100Gbaud, Journal of Lightwave Technology vol. 39, No. 4, 2021. Abstract only.

D. Patel et al, Design, analysis, and transmission system performance of a 41GHz silicon photonic modulator. Opt. Express. vol. 23, No. 11, 2015.

* cited by examiner

DUAL-SLAB-LAYER LOW-LOSS SILICON OPTICAL MODULATOR

This application is continuation of and claims the benefit of U.S. patent application Ser. No. 16/655,090, filed Oct. 16, 2019, the contents of which are incorporated herein in their entirety.

BACKGROUND

The present invention relates to optical communication techniques. More particularly, the present invention provides a silicon optical modulator.

Over the last few decades, the use of communication networks has exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

Progress in computer technology (and the continuation of Moore's Law) is becoming increasingly dependent on faster data transfer between and within microchips. Optical interconnects may provide a way forward, and silicon photonics may prove particularly useful, once integrated on the standard silicon chips. 40-Gbit/s and then 100-Gbit/s data rates WDM optical transmission over existing single-mode fiber is a target for the next generation of fiber-optic communication networks.

SUMMARY

The present invention relates to optical telecommunication techniques. More particularly, the present invention provides a low-loss silicon optical modulator that is directly integrated in a silicon photonics chip for high data rate DWDM optical communications, though other applications are possible.

A silicon optical modulator is fabricated to have a multi-slab structure between the contacts and the waveguide, imparting desirable performance attributes. A first slab comprises dopant of a first level. A second slab adjacent to (e.g., on top of) the first slab, comprises a doped region proximate to a contact, and an intrinsic region proximate to the waveguide. The parallel resistance properties and low overlap between the highly doped silicon and optical mode pigtail afforded by the multi-slab configuration, allow the modulator to operate with reduced optical losses and at a high speed. Embodiments may be implemented in a Mach-Zehnder interferometer or in micro-ring resonator modulator configuration.

An optical modulator according to an embodiment comprises a waveguide having a first waveguide portion of a first conductivity type and a second waveguide portion of a second conductivity type opposite to the first conductivity type, the waveguide configured to communicate an optical signal along a first axis defined within a silicon substrate. A first contact of the first conductivity type is proximate to the first waveguide portion. A second contact of the second conductivity type is proximate to the second waveguide portion. A first multi-slab structure offers parallel conductive pathways of different resistance between the first contact and the first portion. A second multi-slab structure offers parallel conductive pathways of different resistance between the second contact and the second portion. A first slab of the first multi-slab structure proximate to the silicon substrate, is adjacent to a second slab of the first multi-slab structure distal from the silicon substrate, along a second axis orthogonal to the first.

An embodiment of a method comprises creating a first conductive pathway of a first resistance between a first contact of a first conductivity type and a first waveguide portion of the first conductivity type. A second conductive pathway of a second resistance lower than the first resistance is created between the first contact and the first waveguide portion, the second conductive pathway parallel to the first conductive pathway. A third conductive pathway of a third first resistance is created between a second contact of a second conductivity type opposite to the first conductivity type, and a second waveguide portion of the second conductivity type. A fourth conductive pathway of a fourth resistance lower than the third resistance, is created between the second contact and the second waveguide portion, the fourth conductive pathway parallel to the third conductive pathway. A potential difference is applied between the first contact and the second contact to reverse-bias a junction formed at an interface of the first waveguide portion and the second waveguide portion.

An optical modulator integrated with a silicon photonics system comprises a first phase-shifter on a silicon substrate, and a second phase-shifter on the silicon substrate. A first 2×2 splitter has a first exit port coupled to an input port of the first phase-shifter and a second exit port coupled to an input port of the second phase-shifter. A second 2×2 splitter has a first entry port coupled to an output port of the first phase-shifter and a second entry port coupled to an output port of the second phase-shifter. The first phase-shifter comprises a first contact of the first conductivity type proximate to the first waveguide portion, and a second contact of the second conductivity type proximate to the second waveguide portion. The first phase-shifter further comprises a first multi-slab structure offering parallel conductive pathways of different resistance between the first contact and the first portion, and a second multi-slab structure offering parallel conductive pathways of different resistance between the second contact and the second portion. A first slab of the first multi-slab structure proximate to the silicon substrate, is adjacent to a second slab of the first multi-slab structure distal from the silicon substrate, along a second axis orthogonal to the first axis.

Various embodiments achieve these benefits and others in the context of known silicon waveguide laser communication technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DESCRIPTION

The present invention relates to optical telecommunication techniques. More particularly, the present invention provides a low-loss optical modulator formed directly on a silicon substrate, though other applications are possible.

In modern electrical interconnect systems, high-speed serial links have replaced parallel data buses, and serial link speed is rapidly increasing due to the evolution of CMOS technology. Internet bandwidth doubles almost every two years following Moore's Law. But Moore's Law is coming to an end in the next decade. Standard CMOS silicon transistors will stop scaling around 5 nm. And the internet bandwidth increasing due to process scaling will plateau. But Internet and mobile applications continuously demand a huge amount of bandwidth for transferring photo, video, music, and other multimedia files. This disclosure describes techniques and methods to improve the communication bandwidth beyond Moore's law.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, entry, exit, clockwise and counter clockwise have been used for convenience purposes only and are not intended to imply any particular fixed direction. Instead, they are used to reflect relative locations and/or directions between various portions of an object.

Figure 1:
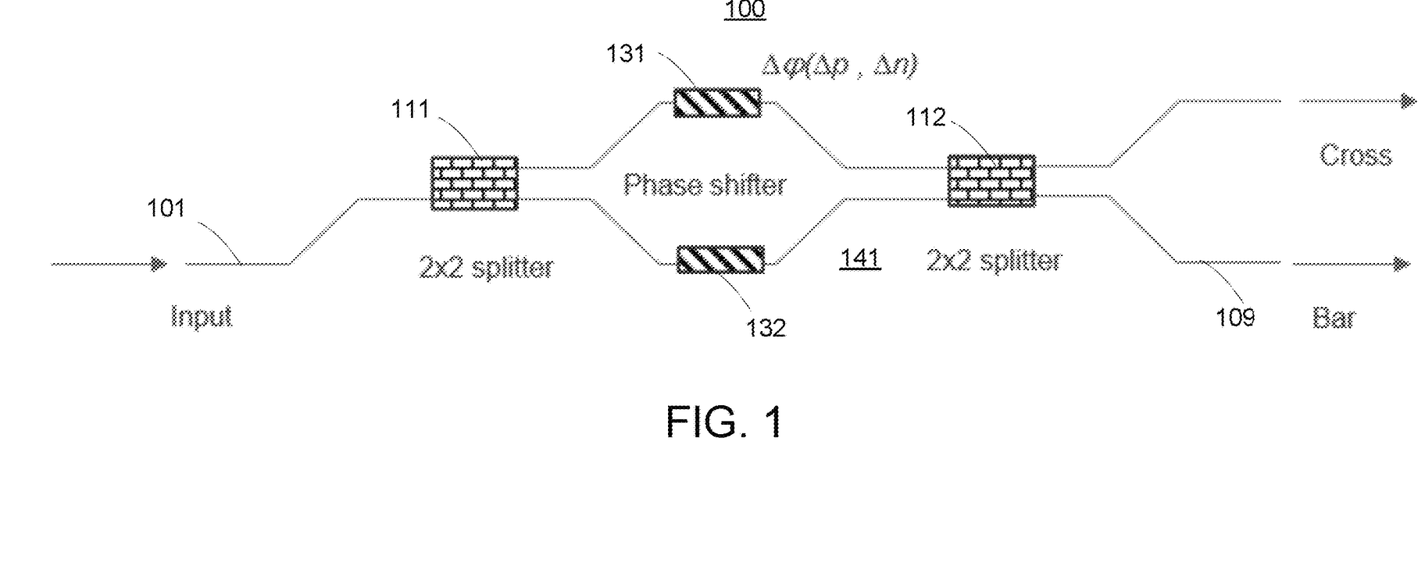
FIG. 1 is a schematic diagram of an optical modulator based upon a phase shift structure formed on silicon according to an embodiment.

FIG. 1 is a schematic diagram of a low-loss optical modulator formed on a silicon substrate according to an embodiment of the present invention. This diagram is merely an example, which should not unduly limit the scope of the claims. One of ordinary skill in the art would recognize many variations, alternatives, and modifications. As shown, the optical modulator 100 is provided formed on a silicon substrate. Optionally, the silicon substrate is a silicon-on-insulator substrate.

The optical modulator 100 is a device fully integrated in a compact form in a chip. In the embodiment, the optical modulator 100 includes a first phase-shifter 131 coupled a second phase-shifter 132 optically in parallel.

At an input side, a first 2×2 splitter 111 is coupled to an input port of each of the first phase-shifter 131 and the second phase-shifter 132. At an output side, a second 2×2 splitter 112 is coupled to an output port of each of the first phase-shifter 131 and the second phase-shifter 132.

An entry port of the first 2×2 splitter 111 is configured to couple with an input fiber, which needs modulation for an optical signal that has already been transported through the input fiber. An exit port of the second 2×2 splitter 112 is configured to couple with an output fiber for outputting the optical signal after the modulation.

Optionally, the 2×2 splitter is a multimode interference coupler. Optionally, the 2×2 splitter is a directional coupler.

Optionally the first phase-shifter 131 is a first waveguide formed on the silicon substrate and the second phase-shifter 132 is a second waveguide formed on the same silicon substrate.

Optionally, the second waveguide coupled with the first waveguide in parallel with a relative phase delay to form a Mach-Zehnder interferometer.

Optionally, the first waveguide 131 comprises a first core material with a first index of refraction $n_1$ and an elongated shape of the first length $L_1$ embedded in a first cladding material 141 on the silicon substrate. In a cross-section view, an example of a waveguide is shown with a core material in a typical rectangular shape embedded in a cladding material overlying a substrate.

The cladding material usually has an index of refraction smaller than that of the core material so that the light can be confined substantially inside the geometry of the core of the waveguide. A combination effect of the waveguide core with a certain geometric shape and respective dimensions and the corresponding indices of refraction for both the first core material and the first cladding material, yields a first phase delay for the optical signal of the certain wavelength passing the first phase-shifter 131.

Similarly, the second waveguide 132 includes a second core material with a second index of refraction $n_2$ and an elongated shape of the second length $L_2$ embedded in the first cladding material 141 formed on the same silicon substrate. A second phase delay for the optical signal passing the second phase-shifter 132 is yielded. The second phase delay may be different from the first phase delay.

Optionally, the first waveguide and the second waveguide coupled in parallel with a relative phase delay to form a Mach-Zehnder interferometer. Overall physical length of the Mach-Zehnder interferometer including both 2×2 splitters 111 and 112 can be made quite compact. For example, the length of the modulator 100 can be just about 100 μm.

In an embodiment, a total phase delay of the modulator 100 is a manifestation of the first phase delay and the second phase delay associated with the structure provided by the Mach-Zehnder interferometer formed by the first waveguide 131 and the second waveguide 132 coupling to the Mach-Zehnder interferometer.

Each of the first waveguide and the second waveguide can be independently fabricated and tuned with material and geometry selections. Optionally, a heating element can be installed to be around each waveguide to tune the index of refraction by changing temperature.

As a result of tuning the first waveguide and the second waveguide as well as properly selecting the corresponding first and second cladding materials under the structure described herein, low loss modulation can be achieved. The modulator 100 is directly integrated in a silicon chip with compact dimensions.

In some embodiments, tuning the first waveguide and the second waveguide can done both during their fabrication and afterward. Optionally, during the fabrication, the core material and cladding material of each waveguide can be properly selected for achieving different value of the phase delay. Optionally, the core material of each waveguide can be one selected from single crystal silicon, poly-crystal silicon, SiN, $Si_3N_4$, SiON, silicon germanium alloy ($Si_xGe_{1-x}$), or other materials compatible with a silicon-on-insulator substrate.

Optionally, the core material for the first waveguide 131 and the second waveguide 132 is the same. Optionally, the core material for the first waveguide 131 is different from that for the second waveguide 132. The first cladding material 141 can be one selected from $SiO_2$, SiN, $Si_3N_4$, SiON, Air, silicon germanium alloy ($Si_xGe_{1-x}$), and indium tin oxide.

In some embodiments, the core of each waveguide can be formed variably with a length and cross-section shape. Optionally, the core can be formed with a cross-sectional shape in rectangular, a simple channel waveguide. Or the core can be formed in complex shape such as a combination of two rectangular shapes. For example, a rib waveguide having a smaller rectangle on top of a wider rectangle, a slot-channel waveguide having two rectangles in parallel separated by a small gap, a slot-rib waveguide having a slot-channel on top of a wider rectangle, and a multi-channel waveguide having two rectangles stacking together. In another example, a triangle shape waveguide can be provided. Optionally, different structures can be designed for the first waveguide 131 and the second waveguide 132 in order to realize different effective indice of refraction.

Each phase-shifter is a waveguide formed with a core of a certain shape and a length within a cladding, which can be characterized by an effective index of refraction $n_{eff}$ and a length L. The effective index of refraction of the phase-shifter depends on the shape the core, the indices of refraction of both the core material and the cladding material, and other properties such as optical-thermal coefficient, mode structure associated with the geometry, wavelength and polarization mode of signals, etc.

In some embodiments, a unit of the first phase-shifter 131 and the second phase-shifter 132 including at least the first 2×2 splitter 111 can be used as a duplicate phase-shifter unit. The duplicate phase-shifter unit can be cascaded in series multiple times.

According to embodiments, a phase change component of a silicon optical modulator is fabricated to have a multi-slab structure between the contacts and the waveguide, imparting desirable performance attributes. A first slab comprises dopant of a first level. A second slab adjacent to (e.g., on top of) the first slab, comprises a doped region proximate to a contact, and an intrinsic region proximate to the waveguide. The parallel resistance properties afforded by the multi-slab configuration, allow the modulator to operate with reduced losses and at a high speed. Embodiments may be implemented in a Mach-Zehnder interferometer or in micro-ring resonator modulator configuration.

It is again noted that future optical communication system is driven by the increasing demand of higher data bandwidth and lower cost. Silicon photonics integration offers a solution, given its enhanced performance and compatibility with CMOS fabrication processes.

High speed Optical signals travelling between data centers need silicon optical modulator with high working bandwidth and low optical loss. Three indicators can determine the performance of the silicon optical modulator:
   modulation efficiency;
   working bandwidth; and
   optical loss.

Conventionally, improvement of any one indicator may be achieved at the expense of reducing the performance of another indicator. However, embodiments provide a silicon optical modulator exhibiting lower optical loss, while maintaining working bandwidth and modulation efficiency.

Certain modulators may be based upon the electro-optical (EO) effect in silicon. This EO effect refers to changes in optical properties of a material in response to an electric field that varies slowly as compared with the frequency of light.

In silicon, the EO effect usually relates to the change of optical refractive index (n) and absorption coefficient (α). There are two kinds of EO effect in silicon:
   the direct EO effect, and
   the indirect EO effect.

As silicon has a symmetric atomic structure, there is no $1^{st}$ order direct EO effect in silicon. And, the 2nd order direct EO effect (Kerr effect) is weak.

Accordingly, a silicon modulator may be designed based upon the indirect EO effect in silicon. That indirect EO effect is known as the free-carrier dispersion effect.

A working principle of a silicon optical modulator operating according to the free-carrier dispersion effect, is now described. Under free-carrier dispersion effect, the refractive index and absorption coefficient of doped silicon can be changed, together with the concentration of free electron and holes which can be tuned by an externally applied electrical field.

Usually, the changing of free-carrier concentration is realized by implanting a P-N junction in the center of the silicon waveguide. Thus, when an optical wave is traveling through the waveguide, optical parameters such as optical phase and optical intensity can be tuned by the external electrical field.

Optical and electrical structures of a silicon optical modulator are now described. In particular, changing of absorption coefficient within silicon may not be efficiently achieved. Thus, in order to change the refractive index of silicon to accomplish the desired modulation, some optical structures may be needed to convert the optical phase change to an optical intensity change.

The possible optical structures for realizing this goal, are Mach-Zehnder interferometers and micro-ring resonators. And, an electrical structure for achieving this effect, is a reversed PN junction.

Figure 2:
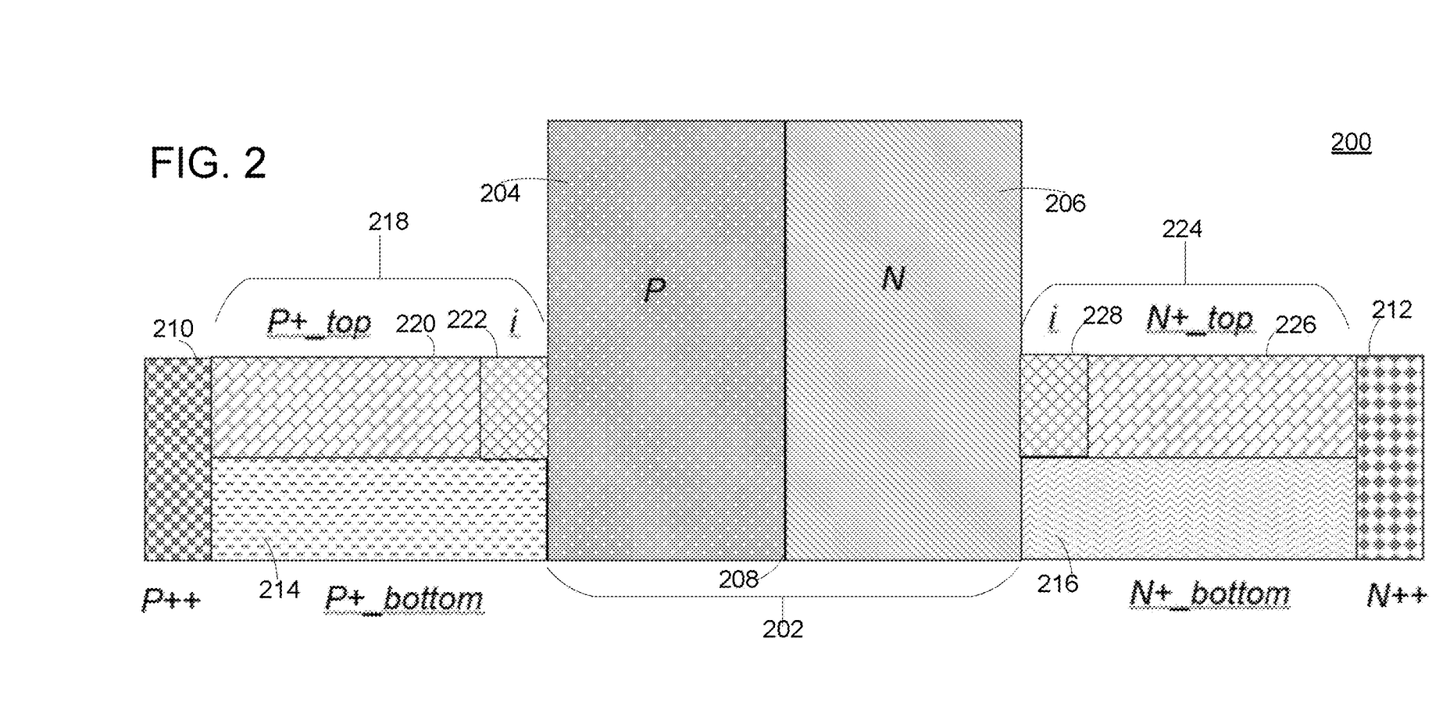
FIG. 2 is a simplified cross-sectional diagram of a dual-slab phase shift structure according to an embodiment.

Accordingly, FIG. 2 shows a simplified cross-sectional diagram illustrating a phase shift structure 200 according to an embodiment. This phase shift structure comprises a waveguide 202 comprising a P doped portion 204 and an N doped portion 206.

A P/N junction (j) 208 is present between the P doped portion and the N doped portion. Application of a reverse bias across the junction 208, can change the concentration profile of the free carriers on the cross section of the waveguide, and hence the refractive index and optical phase of the waveguide. The optical structure such as a Mach-Zehnder interferometer shown in FIG. 1 achieve the conversion of an optical phase change to an optical intensity change and hence achieve the desired modulation of an optical signal traveling along the waveguide.

In particular, phase change structure 200 further comprises heavily doped P++ contact region 210, and heavily doped N++ contact region 212. These contact regions are in electrical contact with a source of potential difference in order apply a reverse bias to the junction.

Application of the reverse bias across the P/N junction of the waveguide, serves to control the phase difference ($\phi$) achieved by the phase change structure. As shown below, this effect is based upon a delta in n and p type character of the material within the waveguide:

$\Delta\phi(\Delta p, \Delta n)$
$\Delta n_{eff}(\Delta p, \Delta n)$;
$\Delta\alpha(\Delta p, \Delta n)$.

According to embodiments, the electrical potential applied to the contacts is communicated to the portions of the waveguide, utilizing a two-slab structure. On the P side, a first slab 214 (here located on the bottom) is doped to a uniform level or non-uniform level. On the N side, a first slab 216 (again, located on the bottom) is also doped to a uniform level or non-uniform level.

A second slab (here located on the top) comprises a doped region proximate to the contact, and an intrinsic (i) region proximate to the waveguide. Thus, on the P side, the second slab 218 comprises a P+ region 220, and an adjacent intrinsic region 222. On the N side, the second slab 224 comprises a N+ region 226 and an adjacent intrinsic region 228.

A variety of different techniques can be utilized to form intrinsic portions as shown in the FIG. 2. According to one approach, dopant can be implanted with sufficient energy to pass through the intrinsic portion, and a reversed type of dopant can be used to compensate the previous dopant then reside below the intrinsic portion in the lower slab layer. Alternatively, the intrinsic portion may comprise a separate intrinsic layer formed after/above the lower slab layer, with lithography utilized to exclude subsequent doping from only the intrinsic portion (but not the adjacent doped portion of the upper slab layer). Thus two possible methods to realize embodiments include: compensating the first type dopant with a second implantation with reversed type of dopant on the top of the slab, and using a lithographic mask and implantation condition to tune the doping profile and result in the intrinsic layer.

This resulting dual-slab architecture imparts desired properties to the phase shift structure. In particular, the dual-slab architecture offers low-loss performance, coupled with high speed operation.

Figure 3:
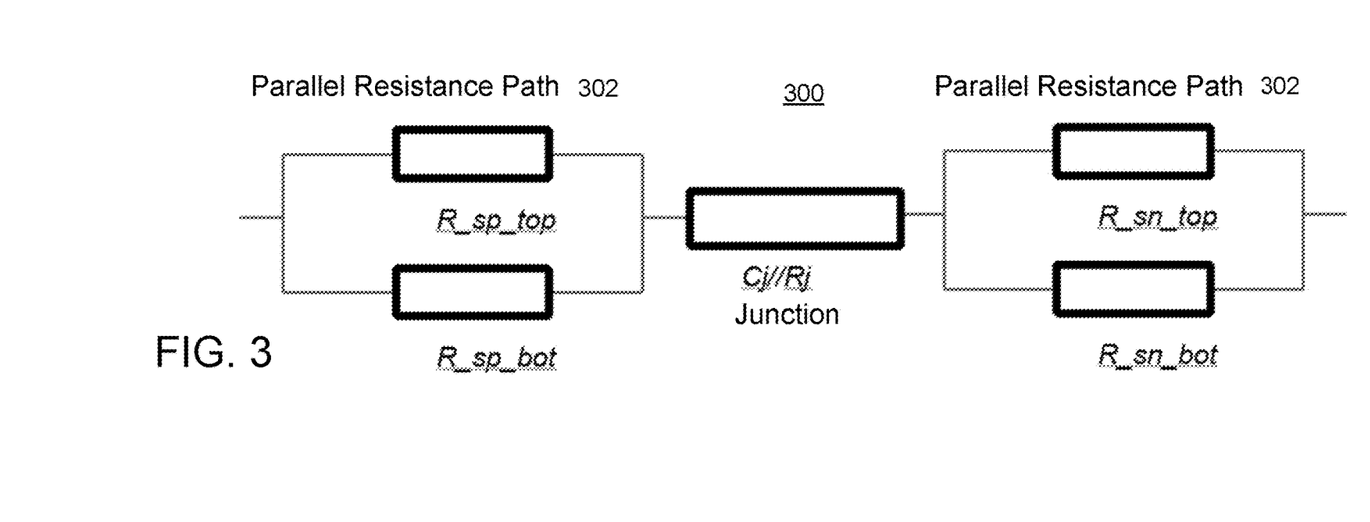
FIG. 3 shows a corresponding circuit for the dual-slab phase shift structure of FIG. 2.

In particular, FIG. 3 shows a corresponding circuit 300 for the dual-slab phase shift structure of FIG. 2. Specifically, FIG. 3 shows the parallel resistance paths 302 afforded by the multi-slab structure.

Here, the low loss characteristic is achieved by the low-level of doping on the top slab:

R_sp_top>R_sp_bot (p-doped side)
R_sn_top>R_sn_bot (n-doped side).

The higher resistance of the top slab may result from a combination of an absolute lower doping level in the top slab relative to the bottom slab, and also the presence of the intrinsic region in the top slab.

Figure 4:
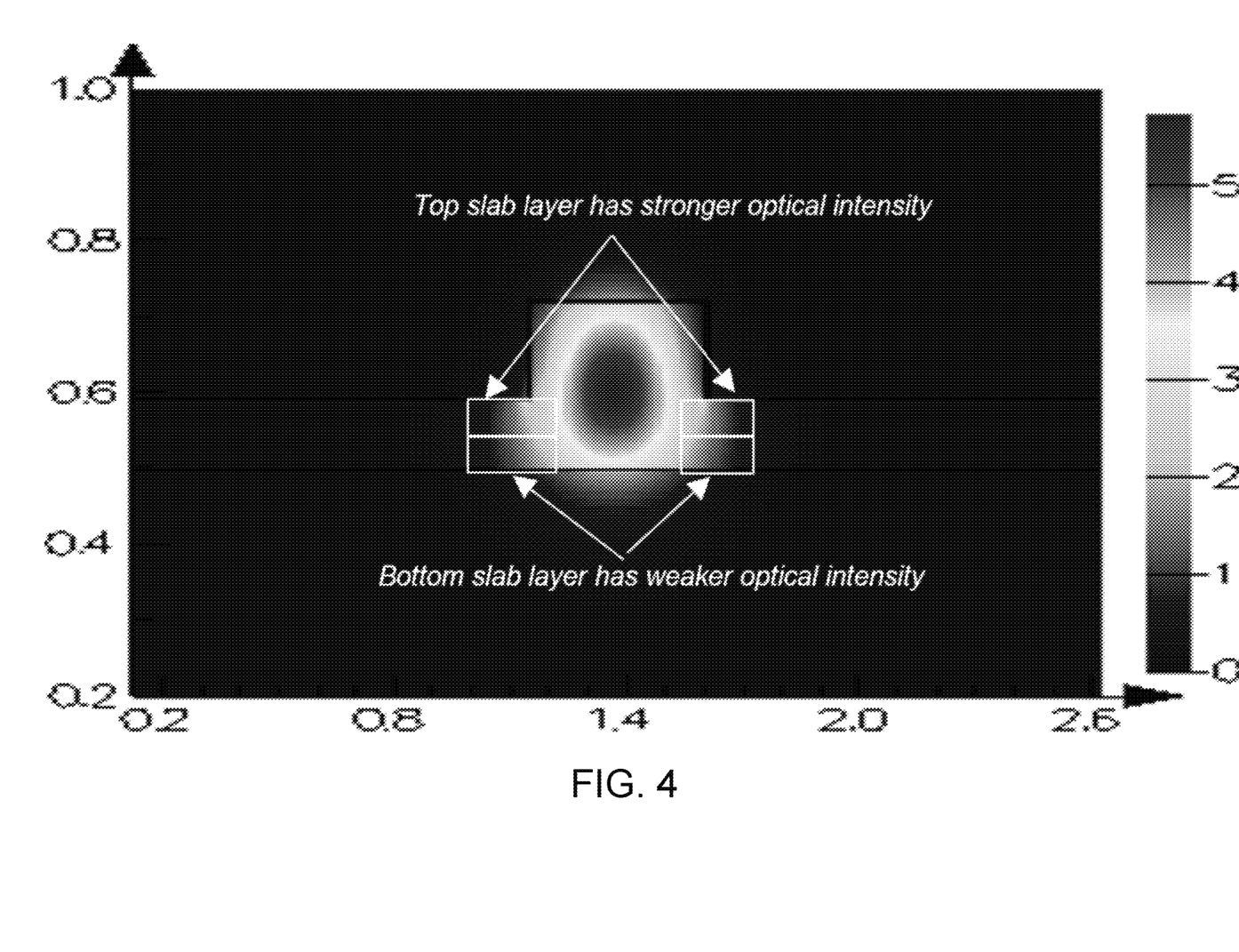
FIG. 4 is a cross-sectional plot of optical intensity for dual-slab phase shift structure of FIG. 2.

Lower doping level on the top of the slab may primarily be used to achieve a lower optical loss, as the optical intensity is strong on the top slab layer. This is shown in FIG. 4.

Meanwhile, reducing the doping level on the top slab will induce a lower speed operation. So utilizing a higher doping level on the bottom slab can compensate the speed performance.

Given a carefully controlled design of the doping levels, the speed performance can be higher than with a modulator architecture featuring only a single slab. In this manner, the high speed operation of the dual-slab layer design offers a benefit.

In summary, the dual-slab structure helps to fine tune the doping profile of the modulator in order to achieve a lower optical loss and higher speed simultaneously. By contrast, in a conventional one-slab modulator structure, the two performance indicators of optical loss and operational speed are a trade-off between one another.

High speed operation of the modulator is achieved by the high-level doping on the bottom slab layer:

R_sp_top//R_sp_bot<R_sp
R_sn_top//R_sn_bot<R_sn, where:
R_sp=resistance of a one-slab structure; and
R_sn=resistance of a one-slab structure.

In this manner, the intrinsic portion serves to reduce the optical loss, while reducing the speed. However, the speed performance is compensated for by increasing the doping level on the bottom slab. Here, R_sp_top//R_sp_bot<R_sp and R_sn_top//R_sn_bot<R_sn, ensures that the dual-slab structure has a higher speed than would a conventional one-slab structure.

FIG. 4 is a cross-sectional plot of optical intensity for dual-slab phase shift structure of FIG. 2. This plot shows that the top slab layer has higher optical intensity.

In particular, optical intensity is strong on the top of the slab, and weaker on the bottom slab. When the doping level on the top slab is reduced, and as the intrinsic layer close to the corner between the slab and the waveguide (called the rib or ridge), the optical loss reduces at that corner because reducing the doping level actually reduce the free carriers' absorption.

But, when the doping level is reduced on the top of the slab, if everything else is maintained the same, the total resistance is increased and the speed will be lower.

To maintain the speed, it is seen that the optical intensity on the bottom of the slab is weak. If the doping level at the bottom of the slab is increased until the total resistance is the same or even lower than the case that without the intrinsic layer on the top slab, then speed can be maintained or even increased.

While the optical loss from the bottom slab will be increase somewhat, its contribution to the overall loss will not be increased that much because the optical intensity is much weaker as compared to the top slab layer. So with the advantage of the different optical intensity on the top and bottom of the slab, a window can be found to overcome the trade-off between optical loss and speed.

For purposes of further illustration, consider a hypothetical case where there is no optical intensity on the bottom slab, and all of the optical intensity lies on the top slab. Under such circumstances, the bottom slab can have an extremely high doping. That doping level is high enough to produce a very low total resistance and hence an extreme high speed. At the same time, the contribution on the optical loss is zero, as there is no optical intensity at the bottom slab. In this manner the trade-off between optical loss and operational speed is overcome by the dual-slab architecture, and these performance characteristics may be decoupled.

While the above description has focused upon an optical modulator architecture comprising two slabs, which offers a simplest case from a processing perspective. However, embodiments are not limited to only two slabs, and could instead feature more than two slabs. Modulator architectures featuring more than two slab layers could help to tailor the doping profile to more precisely match the desired optical intensity profile, resulting in optimum performance of the optical modulator.

And while the above description has focused upon a dual-slab optical modulator architecture having an intrinsic portion in the top slab, this is also not required. Alternative embodiments could provide an intrinsic portion in the bottom slab instead.

Embodiments may offer benefits to reduce the gap of implementation of silicon photonics integration circuits over other types, so that the data center communication can enjoy more of the low-cost advantage conferred by CMOS process based silicon photonics.

Figure 5:
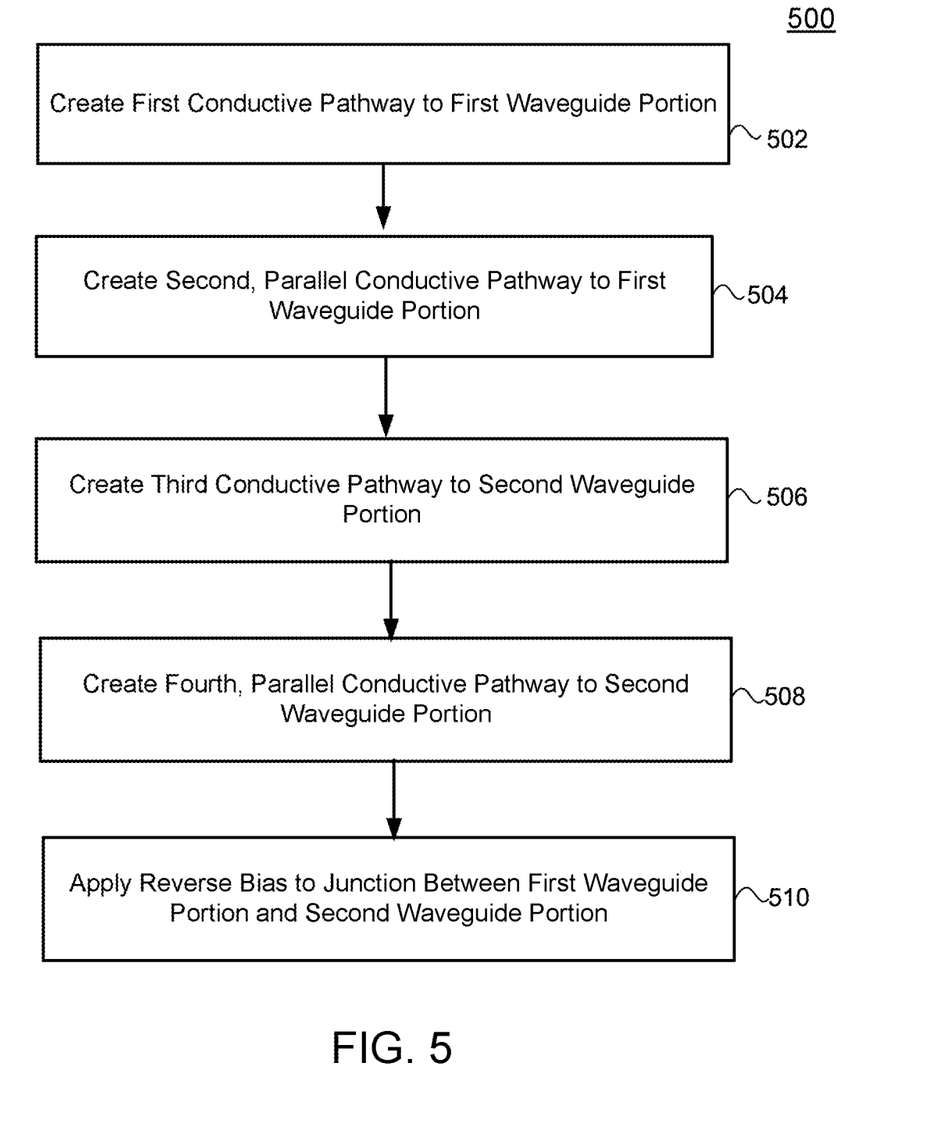
FIG. 5 is flow chart showing a method of performing low-loss modulation of an optical signal in a compact device integrated in a system-on-chip according to an embodiment.

FIG. 5 is flow chart showing a method 500 of performing low-loss modulation of an optical signal in a compact device integrated in a system-on-chip according to an embodiment. This diagram is merely an example, which should not unduly limit the scope of the claims. One of ordinary skill in the art would recognize many variations, alternatives, and modifications.

At 502 a first conductive pathway of a first resistance is created between a first contact of a first conductivity type and a first waveguide portion of the first conductivity type.

At 504, a second conductive pathway of a second resistance lower than the first resistance, is created between the first contact and the first waveguide portion. The second conductive pathway is parallel to the first conductive pathway.

At 506, a third conductive pathway of a third first resistance is created between a second contact of a second conductivity type opposite to the first conductivity type, and a second waveguide portion of the second conductivity type;

At 508, a fourth conductive pathway of a fourth resistance lower than the third resistance, is created between the second contact and the second waveguide portion. The fourth conductive pathway is parallel to the third conductive pathway.

At 510, a potential difference is applied between the first contact and the second contact to reverse-bias a junction formed at an interface of the first waveguide portion and the second waveguide portion.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. An optical modulator comprising:
    a first optical waveguide comprising a P-N junction, the P-N junction configured to receive an optical signal;
    a first contact and a second contact configured to receive an electrical signal, the electrical signal providing a voltage potential difference across the first contact and the second contact and reverse biasing the P-N junction to change at least one of a refractive index and a phase of the first optical waveguide to modulate the optical signal; and
    a first plurality of layers extending laterally from the first contact to the P-N junction and longitudinally along the first optical waveguide, the first plurality of layers comprising a first layer and a second layer, and the first layer having a lower level of p-type doping than the second layer and arranged relative to the first optical waveguide to experience a higher level of optical intensity from the first optical waveguide than experienced by the second layer when light is propagating through the first optical waveguide.

2. An optical modulator as in claim 1, wherein a resistance of the first layer is greater than a resistance of the second layer.

3. An optical modulator as in claim 1, wherein the first layer comprises:
    an intrinsic portion proximate to the first optical waveguide, the intrinsic portion being undoped; and
    a doped portion proximate to the first contact and arranged between the first contact and the intrinsic portion.

4. An optical modulator as in claim 1, further comprising a second optical waveguide, wherein:
    the electrical signal reverse biases the P-N junction to change the phase of the first optical waveguide; and
    the first optical waveguide and the second optical waveguide operate as a Mach-Zehnder interferometer, which converts the change in the phase to a change in optical intensity of an optical fiber provided at an output of the optical modulator.

5. An optical modulator as in claim 1, wherein the P-N junction, the first contact, the second contact, and the first plurality of layers are implemented as a silicon-on-insulator (SOI) substrate.

6. An optical modulator as in claim 1, further comprising a heating element in thermal communication with the first optical waveguide.

7. An optical modulator as in claim 1, wherein a longitudinal length of the first optical waveguide is 100 micrometers.

8. An optical modulator as in claim 1, wherein:
    the first layer comprises a p-type doped portion and an intrinsic portion, the intrinsic portion being undoped; and
    at least one of
        a cross-section of the p-type doped portion, taken from the first contact to the intrinsic portion, has a smaller rectangular area than a cross-section of the second layer taken from the first contact to the P-N junction; and
        the p-type doped portion and the intrinsic portion are separated by a gap and extend in parallel from an optical input to an optical output of the first optical waveguide.

9. An optical modulator as in claim 1, wherein:
    the first layer is disposed on the second layer; and
    the first layer and the second layer extend parallel to a longitudinal axis of the first optical waveguide.

10. An optical modulator as in claim 9, wherein:
the first layer is disposed on the second layer and comprises a first side edge and a second side edge;
the first side edge of the first layer is in contact with the first contact and extends parallel to the longitudinal axis of the first optical waveguide; and
the second side edge of the first layer is in contact with the P-N junction and extends parallel to the longitudinal axis of the first optical waveguide.

11. An optical modulator as in claim 9, wherein:
the second layer comprises a first side edge and a second side edge;
the first side edge of the second layer is in contact with the first contact and extends parallel to a longitudinal axis of the first optical waveguide; and
the second side edge of the second layer is in contact with the P-N junction and extends parallel to a longitudinal axis of the first optical waveguide.

12. An optical modulator as in claim 1, further comprising a second plurality of layers extending laterally from the P-N junction to the second contact and longitudinally along the first optical waveguide, wherein:
the second plurality of layers comprising a third layer and a fourth layer; and
the third layer has a lower level of n type doping than the fourth layer and is arranged relative to the first optical waveguide to experience a higher level of optical intensity than experienced by the fourth layer when light is propagating through the first optical waveguide.

13. An optical modulator as in claim 12, wherein a resistance of the third layer is greater than a resistance of the fourth layer.

14. An optical modulator as in claim 1, further comprising:
a second optical waveguide; and
a first splitter configured to split light received from an optical fiber to the first optical waveguide and the second optical waveguide.

15. An optical modulator as in claim 14, wherein the first splitter is implemented as a multimode interference coupler and configured to output the optical signal to the first optical waveguide.

16. An optical modulator as in claim 14, wherein the first splitter is implemented as a directional coupler and is configured to output the optical signal to the first optical waveguide.

17. An optical modulator as in claim 14, further comprising a second splitter configured to receive the modulated optical signal from the first optical waveguide and an output of the second optical waveguide and, based on the modulated optical signal and the output of the second optical waveguide, to provide an output of the optical modulator.

18. An optical modulator comprising:
an optical waveguide comprising a P-N junction, the P-N junction configured to receive an optical signal;
a first contact and a second contact configured to receive an electrical signal, the electrical signal providing a voltage potential difference across the first contact and the second contact and reverse biasing the P-N junction to change at least one of a refractive index and a phase of the first optical waveguide to modulate the optical signal; and
a plurality of layers extending laterally from the P-N junction to the second contact and longitudinally along the optical waveguide, the plurality of layers comprising a first layer and a second layer, and the first layer having a lower level of n-type doping than the second layer and arranged relative to the optical waveguide to experience a higher level of optical intensity from the optical waveguide than experienced by the second layer when light is propagating through the optical waveguide.

* * * * *